Patented Oct. 5, 1937

2,094,902

UNITED STATES PATENT OFFICE 2,094,902

PROCESS OF PRODUCING BARIUM SULPHATE FROM BARIUM SULPHIDE

Manfred Müller, Homberg, Germany, assignor to firm Sachtleben Aktiengesellschaft für Bergbau und Chemische Industrie, Cologne-on-the-Rhine, Germany No Drawing. Application February 7, 1936, Serial No. 62,813. In Germany February 25, 1935

1 Claim. (Cl. 23—122)

The present invention relates to a process of producing barium-sulphate (permanent white) from barium-sulphide.

Precipitated barium sulphate is usually produced by causing a conversion between a water-soluble barium compound and sulphuric acid or sulphates. The cheapest water-soluble barium compound which can be obtained from natural heavy spar, is the barium sulphide, and the simplest way to obtain precipitated barium sulphate is to decompose barium sulphide with sulphuric acid after the equation:

$$BaS + H_2SO_4 = BaSO_4 + H_2S$$

This process does however give a product which is greyish and disagreeable looking, and it is therefore difficult to get the same sold. Moreover, the treatment of the hydrogen sulphide formed by the decomposition is very complicated and causes much inconvenience, particularly because this hydrogen sulphide is dissolved in the precipitated mass. It has also been proposed to produce barium sulphate by converting the water-insoluble barium carbonate or witherite with sulphuric acid. On account of the costs of the starting material this process is however not economical.

According to the present invention, the sulphide ion is oxidized to sulphate ion or sulphuric acid separate from the barium ion, and the constituents are thereupon combined to barium sulphate. The BaS is indirectly oxidized to BaSO$_4$. A direct oxidation is from economical reasons not accomplishable. Barium sulphide is for instance in a manner known per se by means of carbonic acid decomposed into barium carbonate and hydrogen sulphide after the equation:

$$BaS + H_2CO_3 = BaCO_3 + H_2S$$

The hydrogen sulphide formed is combusted whereby sulphurous acid is formed, and this acid is in known manner converted into sulphuric acid. By means of the sulphuric acid obtained in this manner the barium carbonate is decomposed into barium sulphate and carbonic acid after the equation:

$$BaCO_3 + H_2SO_4 = BaSO_4 + H_2O + CO_2$$

The carbonic acid set free is reintroduced into the process and used to decompose fresh amounts of barium sulphide, whilst the barium sulphate in known manner is subjected to a further treatment, whereby permanent white in the form of a paste or a powder is obtained as end product. The described novel process has advantages of various kinds. The permanent white obtained, shows a white color of extreme purity, because no hydrogen sulphide is present and therefore no dark heavy metal sulphides are formed. Such sulphides always impart a greyish color to the precipitated barium sulphate. In the novel process also no by-products are formed which would need further treatment and for which, from economical reasons, a market would have to be found.

In the novel process, which may be defined as an economical oxidation of BaS to BaSO$_4$, all intermediate products enter at once again into reaction after the equations:

$$\begin{array}{l} BaS + H_2CO_3 = BaCO_3 + H_2S \\ H_2S + 2O_2 = H_2SO_4 \\ H_2SO_4 + BaCO_3 = BaSO_4 + H_2CO_3 \end{array}$$

Thus, the only starting material is BaS and the only end product is BaSO$_4$.

What I claim is:

A continuous cyclic process of producing barium sulphate from barium sulphide, comprising the steps of first converting the barium sulphide into barium carbonate and hydrogen sulphide by reacting said barium sulphide with gaseous carbonic acid, thereupon oxidizing the hydrogen sulphide to sulphuric acid, converting the barium carbonate into barium sulphate and carbonic acid by reacting same with sulphuric acid so produced and reintroducing the carbonic acid thus obtained into the process for the first conversion of the barium sulphide.

MANFRED MÜLLER.